United States Patent
Taniguchi et al.

(10) Patent No.: US 8,316,776 B2
(45) Date of Patent: Nov. 27, 2012

(54) ROTARY BEARING, ROTARY TABLE DEVICE AND TABLE DIAMETER DETERMINING METHOD

(75) Inventors: Shigeru Taniguchi, Tokyo (JP); Toshiya Tanaka, Tokyo (JP); Toshiyuki Aso, Tokyo (JP)

(73) Assignee: THK Co., Ltd., Tokyo (JP)

( * ) Notice: Subject to any disclaimer, the term of this patent is extended or adjusted under 35 U.S.C. 154(b) by 399 days.

(21) Appl. No.: 12/593,638

(22) PCT Filed: Mar. 28, 2008

(86) PCT No.: PCT/JP2008/056044
§ 371 (c)(1),
(2), (4) Date: Sep. 29, 2009

(87) PCT Pub. No.: WO2008/123407
PCT Pub. Date: Oct. 16, 2008

(65) Prior Publication Data
US 2010/0102496 A1    Apr. 29, 2010

(30) Foreign Application Priority Data
Mar. 30, 2007 (JP) ................... 2007-095572
Jul. 31, 2007 (JP) ................... 2007-199193

(51) Int. Cl.
*A47B 85/00*    (2006.01)
*F16C 32/06*    (2006.01)

(52) U.S. Cl. ......................... 108/20; 384/100

(58) Field of Classification Search ............ 108/20, 108/21, 22, 94; 74/16, 89.34, 89.33, 813; 384/108, 107, 713, 113, 100
See application file for complete search history.

(56) References Cited

U.S. PATENT DOCUMENTS

| | | | | |
|---|---|---|---|---|
| 4,615,418 A | * | 10/1986 | Atwell | 188/170 |
| 5,066,197 A | * | 11/1991 | Champagne | 384/100 |
| 5,524,502 A | * | 6/1996 | Osanai | 108/20 |
| 5,941,646 A | * | 8/1999 | Mori et al. | 384/100 |
| 6,524,004 B2 | * | 2/2003 | Fujikawa et al. | 384/100 |

(Continued)

FOREIGN PATENT DOCUMENTS
EP    1 736 277    12/2006
(Continued)

OTHER PUBLICATIONS
International Search Report—PCT/JP2008/056044—Jul. 8, 2008.

*Primary Examiner* — Jose V Chen
(74) *Attorney, Agent, or Firm* — Young & Thompson

(57) ABSTRACT

A rotary table device includes a hollow motor drive source, a table rotated thereby, and a rotary bearing supporting the table. The rotary bearing is provided an outer race having an inner surface to which a rolling surface is formed, an inner race having an outer peripheral surface to which a rolling surface opposing to the rolling surface of the outer race is formed, and a plurality of rolling members disposed in a rolling passage formed by the rolling surface of the outer race and the rolling surface of the inner race, and a cooling medium passage ($\alpha$, $\beta$) is formed so as to be adjacent to either one of the inner race and outer race constituting a rotational driving side. According to the structure mentioned above, a rotary bearing and a rotary table device capable of achieving suitable cooling effect can be provided.

10 Claims, 12 Drawing Sheets

U.S. PATENT DOCUMENTS

| | | | |
|---|---|---|---|
| 6,834,997 B2 * | 12/2004 | Uesugi et al. | 384/100 |
| 7,258,487 B2 * | 8/2007 | Yazawa et al. | 384/100 |
| 7,614,791 B2 * | 11/2009 | Shishido et al. | 384/100 |
| 2001/0021283 A1 * | 9/2001 | Kusunoki | 384/100 |
| 2003/0081867 A1 * | 5/2003 | Weissbacher | 384/100 |
| 2004/0126040 A1 * | 7/2004 | Shih et al. | 384/100 |
| 2006/0126976 A1 * | 6/2006 | Huang et al. | 384/100 |
| 2010/0244601 A1 * | 9/2010 | Shimizu et al. | 384/100 |

FOREIGN PATENT DOCUMENTS

| | | |
|---|---|---|
| JP | 61-175354 | 8/1986 |
| JP | 63-207536 | 8/1988 |
| JP | 2000-288870 | 10/2000 |
| JP | 2004-130468 | 4/2004 |
| JP | 2005-271176 | 10/2005 |

* cited by examiner

ROTARY BEARING, ROTARY TABLE DEVICE AND TABLE DIAMETER DETERMINING METHOD

TECHNICAL FIELD

The present invention relates to a rotary bearing and a rotary table device specifically provided with a cool g structure. Furthermore, the present invention relates to a rotary table device and a table diameter determining method at a time of designing the rotary table device.

BACKGROUND ART

For example, in a technological field of a machine tool, there has been provided a machine tool commonly provided with a three-axis driving mechanism for moving a spindle portion for mounting a tool in X-axis, Y-axis and Z-axis directions and a rotary driving mechanism for rotating a support member, such as table, for supporting a workpiece to be worked around a C-axis and/or A-axis (for example, please refer to the following Patent Document 1). In such machine tool, the three-axis drive mechanism is driven by each of liner motors, and the rotary driving mechanism is driven by a hollow motor. More especially, the rotary driving mechanism more quickly starts to be driven by the direct driving of the hollow motor, and a transmission member such as pulley and/or a reduction mechanism may be eliminated in a mechanism for rotating and driving the C-axis and A-axis, thus being effective.

However, in the machine tool provided with both the three-axis drive mechanism and the rotary driving mechanism mentioned above includes many troublesome matters for a practical use or realization, and hence, such machine tool has not been realized in practical use For example, explanation may be made with respect to a C-axis table as a rotary driving mechanism around the C-axis. As commercial needs of the C-axis table, it is required to provide functions of high performance and high speed rotation for realizing working operation with high performance and high efficiency, and in addition, in relation to light cutting working by a machining center, it is at the same tome required to provide high load bearing performance which opposes to the functions of high performance and high speed rotation mentioned above. However, in a conventional technology, from the requirement of properly rotating a holding member such as table for holding the workpiece around the C-axis, it has been attempted to set such holding member using a general rotary bearing.

Patent Document 1: Japanese Unexamined Patent Application Publication No. 2004-130468.

DISCLOSURE OF THE INVENTION

Problems to be Solved by the Invention

By the way, it is required for the support member mentioned above to perform a rotational movement at 1000-1200 revolution/min. for working a workpiece and, in addition, to have high rigidity for safely and stably holding the workpiece.

However, it is very difficult for the rotary bearing which has to hold the support member mentioned above to simultaneously attain the functions and effects opposing to high performance, high speed rotation and high load-bearing performance. That is, in order to stably realize the high speed rotation, it is preferable to utilize a rotary ball bearing using balls each having a small contacting area, but it is difficult for the rotary ball bearing to be satisfactorily endowed with high rigidity required for a machine tool. On the other hand, in order to satisfy the high rigidity required for the machine tool, although it may be considered to use a rotary roller bearing having a contacting area larger than that of the ball, such use of the rotary roller bearing may provide a high rigidity, but provides a large load due to friction, for example, caused by the high speed rotation with the large contacting area, and in an adverse case, a member on the rotating side may be extremely heated, thus being inconvenient.

However, in the technical field of the machine tool, any technical means for solving the above inconvenience has not been proposed. Of course, in prior art references including the above-mentioned Patent Document 1, there is also not provided techniques that achieve functions and effects such as the high performance, high speed rotation and high load bearing performance opposing to the functions of the rotary bearing. Accordingly, the conventional machine tool driven with multi-spindle may be said as a device that cannot sufficiently achieve the functions and effects based on the adoption of the direct driving structure.

The present invention was made in consideration of the above matters encountered in the prior art mentioned above and an object thereof is to provide a rotary bearing and a rotary table device capable of achieving appropriate cooling effect, thereby simultaneously realizing high speed rotation, high rigidity and high load-bearing performance of the rotary bearing utilized for a machine tool. In addition, the present invention aims to obtain a machine tool capable of sufficiently achieving advantages of a multi-axial driving mechanism by utilizing the rotary bearing and the rotary table device mentioned above.

Furthermore, the inventors considered it important to develop technologies for combining a rotary bearing and a direct drive motor that can achieve the high performance, high speed rotation and high torque, which are characteristics of the direct drive motor such as hollow motor, as well as the high load-bearing performance, high rigidity and high performance, which are characteristics of the rotary bearing.

Then, the present invention aims to obtain a machine tool realizing simultaneously the high performance, high speed rotation and high load-bearing performance by combining the rotary bearing and the direct drive motor. Furthermore, the present invention provides a table diameter determining method utilized for easily and properly determining diameter of a table of a new rotary table device.

Means for Solving the Problems

A rotary bearing according to the present invention comprises: an outer race having an inner peripheral surface to which a rolling surface is formed; an inner race having an outer peripheral surface to which a rolling surface opposing to the rolling surface of the outer race is formed; and a plurality of rolling members disposed in a rolling passage formed by the rolling surface of the outer race and the rolling surface of the inner race, wherein a cooling medium passage is formed so as to be adjacent to either one of the inner race and outer race constituting a rotational driving side.

In the rotary bearing according to the present invention, the cooling medium passage may be formed along at least a portion of a peripheral surface of either one of the inner race and outer race constituting the rotational driving side.

In the rotary bearing according to the present invention the outer race and the inner race may be provided with mounting means used for attachment, and a plate member is interposed to at least a portion at which the cooling medium passage and the mounting means are adjacently disposed.

In the rotary bearing according to the present invention, the plate member may be provided with a cooling fin.

In the rotary bearing according to the present invention, the cooling medium passage may be provided for the inner race or outer race constituting the rotational driving side, or a mounting member to which the rotary bearing is mounted.

A rotary table device according to the present invention comprises: a hollow motor constituting a drive source; a table rotated by the hollow motor; and a rotary bearing supporting rotational motion of the table, the rotary bearing comprising: an outer race having an inner surface to which a rolling surface is formed; an inner race having an outer peripheral surface to which a rolling surface opposing to the rolling surface of the outer race is formed; and a plurality of rolling members disposed in a rolling passage formed by the rolling surface of the outer race and the rolling surface of the inner race, wherein a cooling medium passage is formed so as to be adjacent to either one of the inner race and outer race constituting a rotational driving side.

The rotary table device according to the present invention may further include a passage forming pipe in which at least a portion of the cooling medium passage penetrates, the passage forming pipe being disposed so as to penetrate the hollow motor. In the rotary table device according to the present invention, the cooling medium passage may include a cooling medium introduction passage for introducing the cooling medium before heat radiation of the rotary bearing, and a cooling medium discharge passage for discharging the cooling medium after the hear radiation of the rotary bearing, and the cooling medium introduction passage and the cooling medium discharge passage both penetrating the passage forming pipe may be formed along an axial line of the passage forming pipe, and the cooling medium discharge passage may be disposed on an outer peripheral side of the cooling medium introduction passage.

In the rotary table device according to the present invention, the passage forming pipe may be composed of a brake shaft.

Another rotary table device according to the present invention comprises: a hollow motor constituting a driving source; a table rotated by the hollow motor; and a rotary bearing supporting rotational motion of the table, wherein the hollow motor is composed of a direct drive motor directly giving a rotational driving force to the table.

In another rotary table device according to the present invention, it may be desirable that the rotary bearing is constructed as a roller bearing having plural rows of rolling passages, and comprising: an outer race having an inner surface to which a plurality of rolling surfaces are formed; an inner race having an outer peripheral surface to which a plurality of rolling surfaces opposing to the rolling surfaces of the outer race are formed; and a plurality of rollers disposed in a plurality of rolling passages formed by the rolling surfaces of the outer race and the rolling surfaces of the inner race.

In another rotary table device according to the present invention, it may be desired that the plurality of rollers disposed in the plurality of rolling passages is constructed such that a line of action of a load prescribed as a virtual line extending in a direction perpendicular to the rolling surface of the roller inclines in a constant direction in each row with respect to a radial direction of the rotary bearing on a section along the axial direction of the rotary bearing, and a line of action of a load of the roller at least one rolling passage and a line of action of a load of the roller of another rolling passage intersect on an inner peripheral side or outer peripheral side of the rolling passages of the plural rows.

In another rotary table device according to the present invention, it may be desired that the outer race or inner race of the rotary bearing is sandwiched between a rotor or a stator constituting the hollow motor or a member connected to the rotor or the stator and the table or a member connected to the table.

A table diameter determining method, according to the present invention, of determining a diameter of a rotary table, which comprises a hollow motor constituting a driving source, a table rotated by the hollow motor, and a rotary bearing supporting rotational motion of the table, wherein the hollow motor is composed of a direct drive motor directly giving a rotational driving force to the table, the table diameter determining method comprising: a D and M inputting step of inputting at least one set of D and M; an L calculating step of calculating an L by substituting the D and M input in the D and M inputting step into a following expression (1) ; a J calculating step of calculating a J by substituting a set of the D, M and L obtained by the L calculating step into a following expression (2); and a D and M selecting step of selecting the set of the D and M satisfying a following inequality expression (3) based on the J calculated in the J calculating step,

[Expression 1]

$$L = 4M/\pi \eta D^2 \qquad (1)$$

[Expression 2]

$$J = M \times (D^2/26 + L^2/12) \qquad (2)$$

[Expression 3]

$$J \leq \text{Largest Load Inertia of Hollow Motor} \qquad (3)$$

wherein D (mm): table diameter; L (mm): total length of table and work; M (kg): total weight of table and work; $\eta$ (kg/mm$^3$): specific gravity of table; and J (kg·m$^2$): inertia of table.

Effects of the Invention

According to the present invention, it is possible to provide a rotary bearing and a rotary table device capable of achieving proper cooling effect, so that the high speed rotation, the high rigidity and the high load-bearing performance of the rotary bearing utilized for a machine tool can be simultaneously realized. Furthermore, by utilizing the rotary bearing and the rotary table device of the present invention, there can be also realized a machine tool capable of sufficiently achieving advantageous effects of the multi-axial driving.

Furthermore, according to the present invention, it is possible to obtain a machine tool that simultaneously realizing the high performance, the high speed rotation, the high load-bearing performance and so on can be simultaneously realized by operatively combining the rotary bearing and the direct drive motor. Still furthermore, the present invention can also provide a table diameter determining method for easily and properly determining a table of a new rotary table device.

BRIEF DESCRIPTION OF THE INVENTION

MODE FOR CARRYING OUT THE INVENTION

First Embodiment

Hereunder, a first preferred embodiment for embodying the present invention will be explained with reference to FIGS. 1 to 5. It is further to be noted that the first embodiment mentioned hereunder is not one limited to the invention according to respective patent claims, and that various combinations of the characteristic features explained in the first embodiment are not essential for the solution of the present invention.

Figure 1:
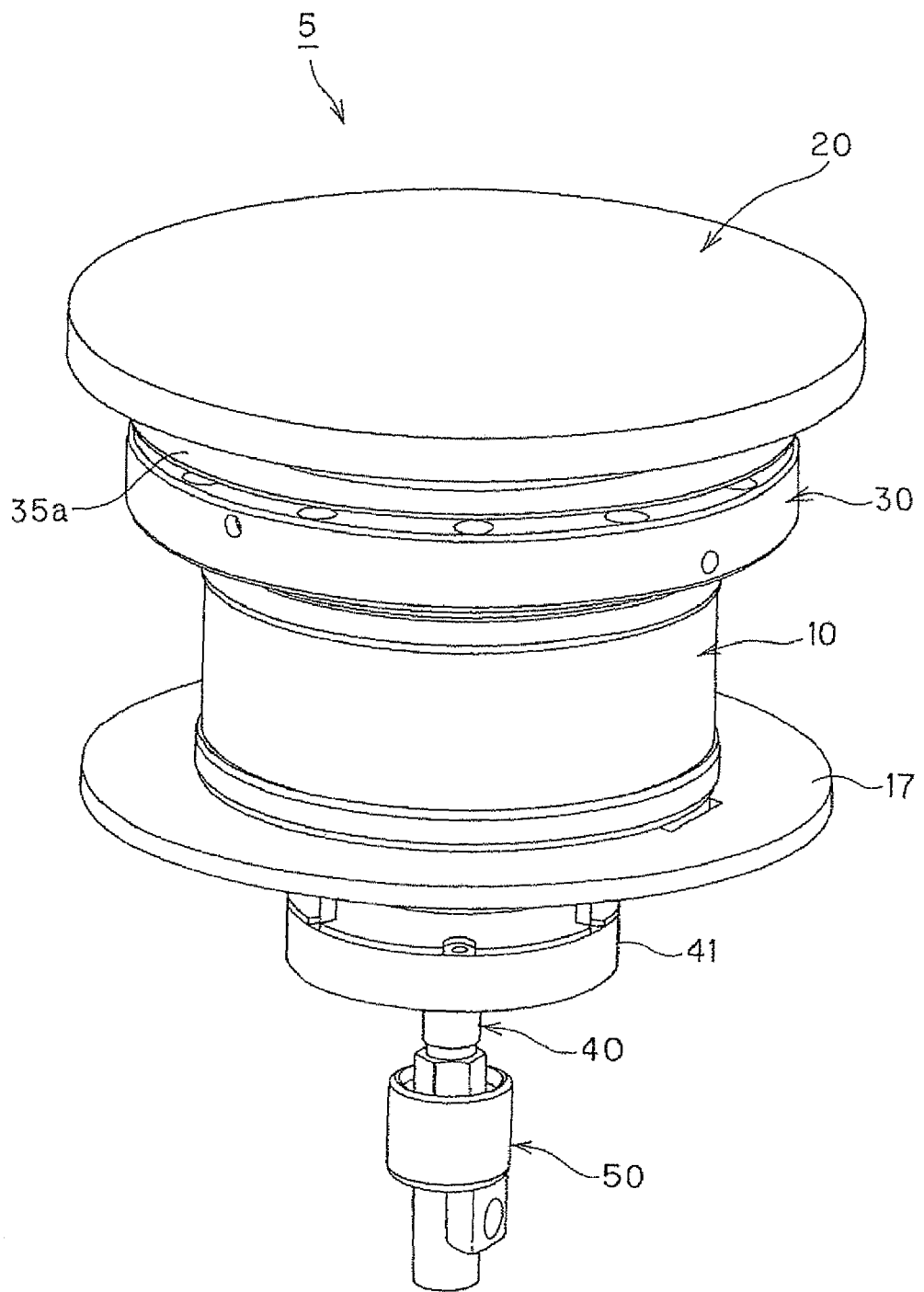
FIG. 1 is a perspective view showing outer configuration of an entire structure of a rotary table device according to a first embodiment of the present invention.
Figure 2:
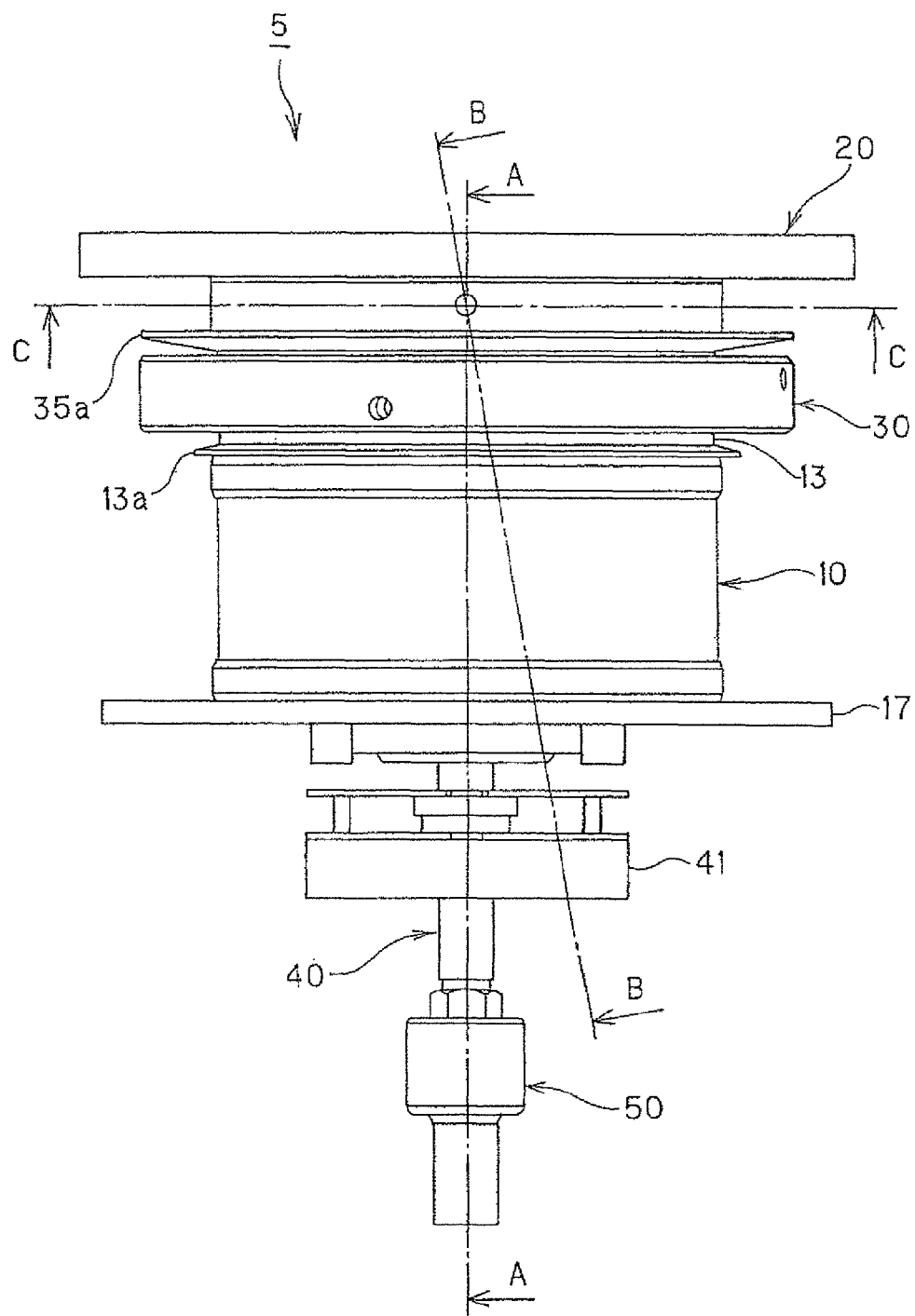
FIG. 2 is a front view showing an entire structure of the rotary table device according to the first embodiment.
Figure 3:
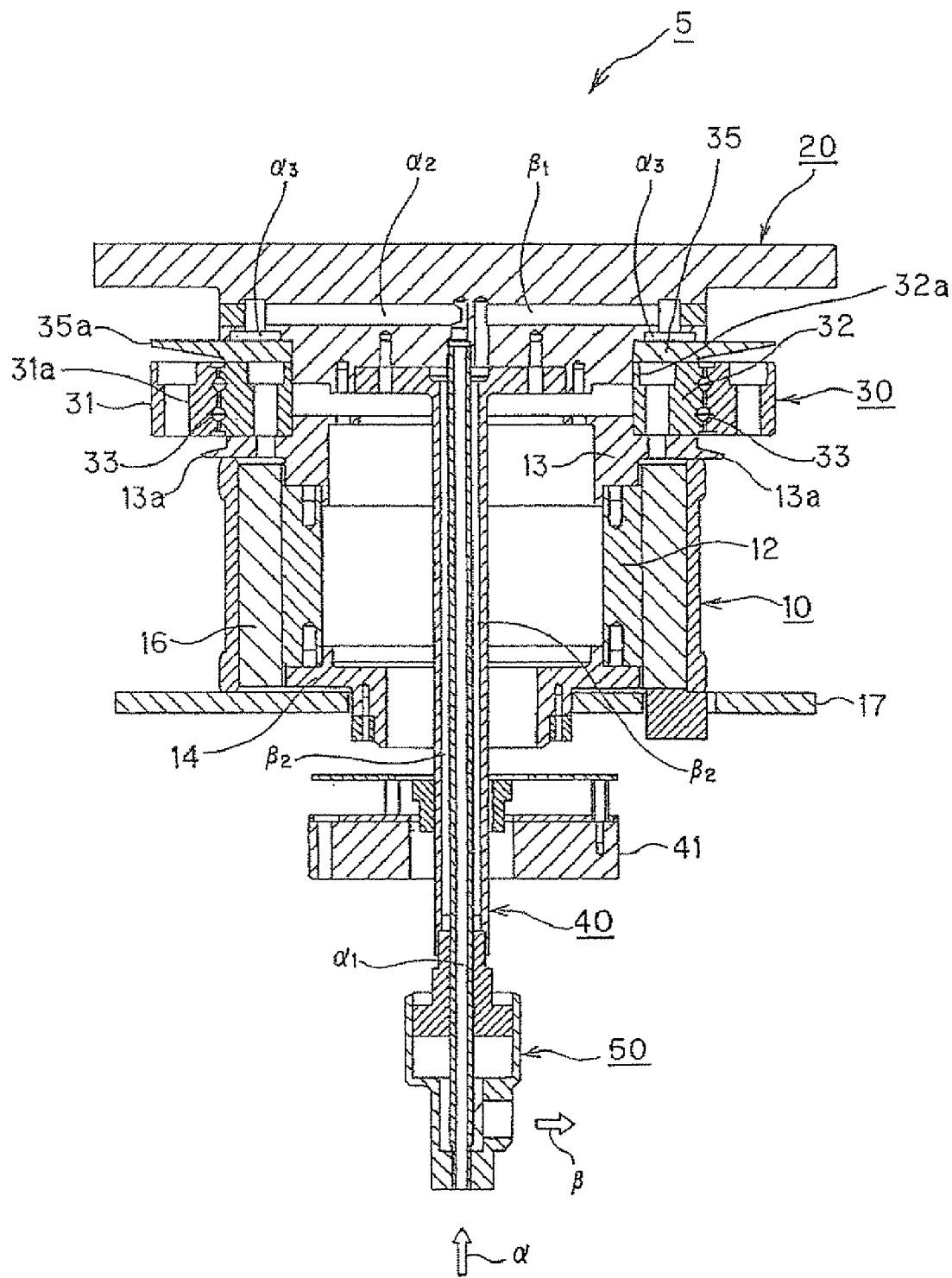
FIG. 3 is a sectional view, especially, of A-A section in FIG. 2, for explaining specific structure of the rotary table device according to the first embodiment.
Figure 4:
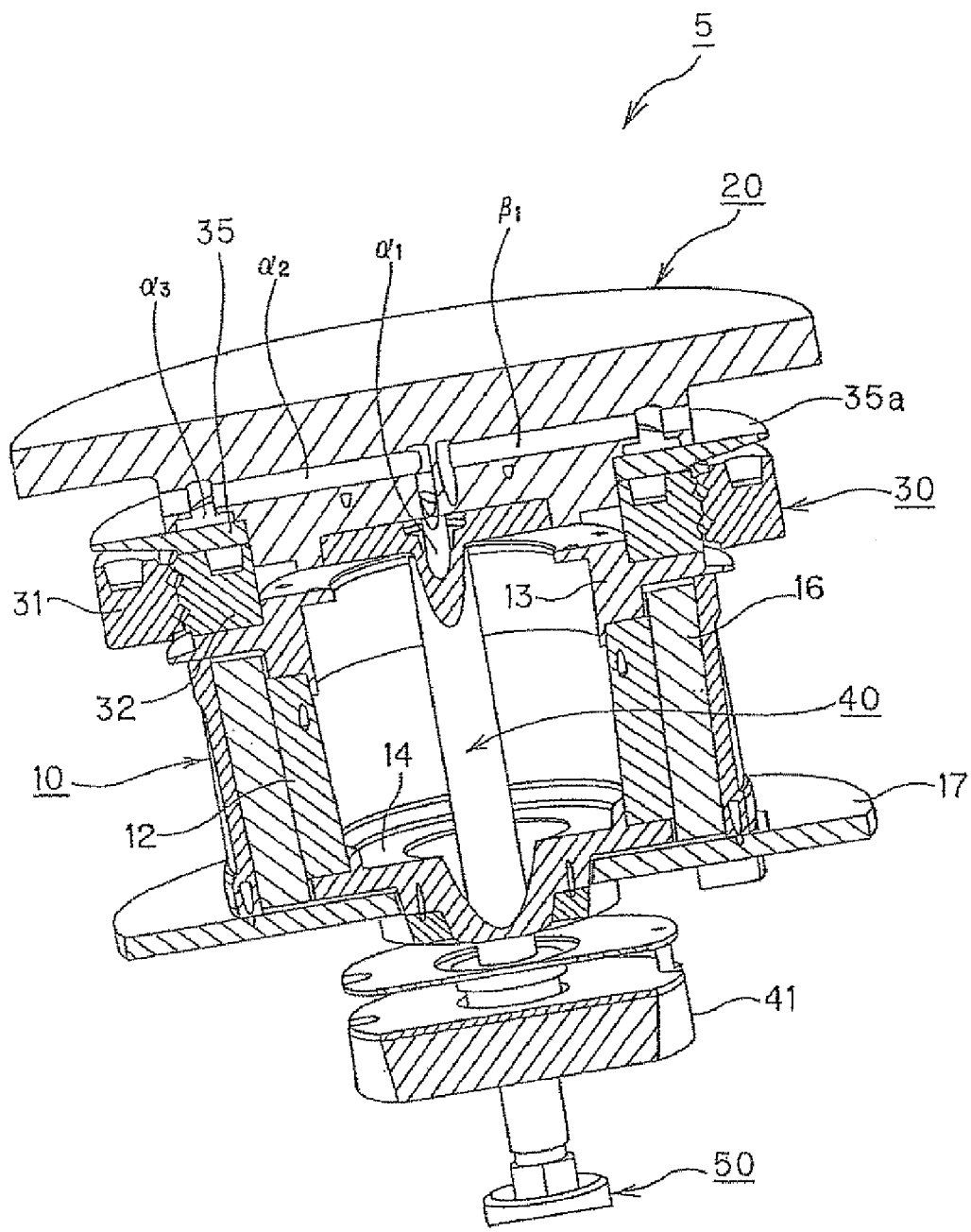
FIG. 4 is a sectional view, especially, of B-B section in FIG. 2, for explaining specific structure of the rotary table device according to the first embodiment.
Figure 5:
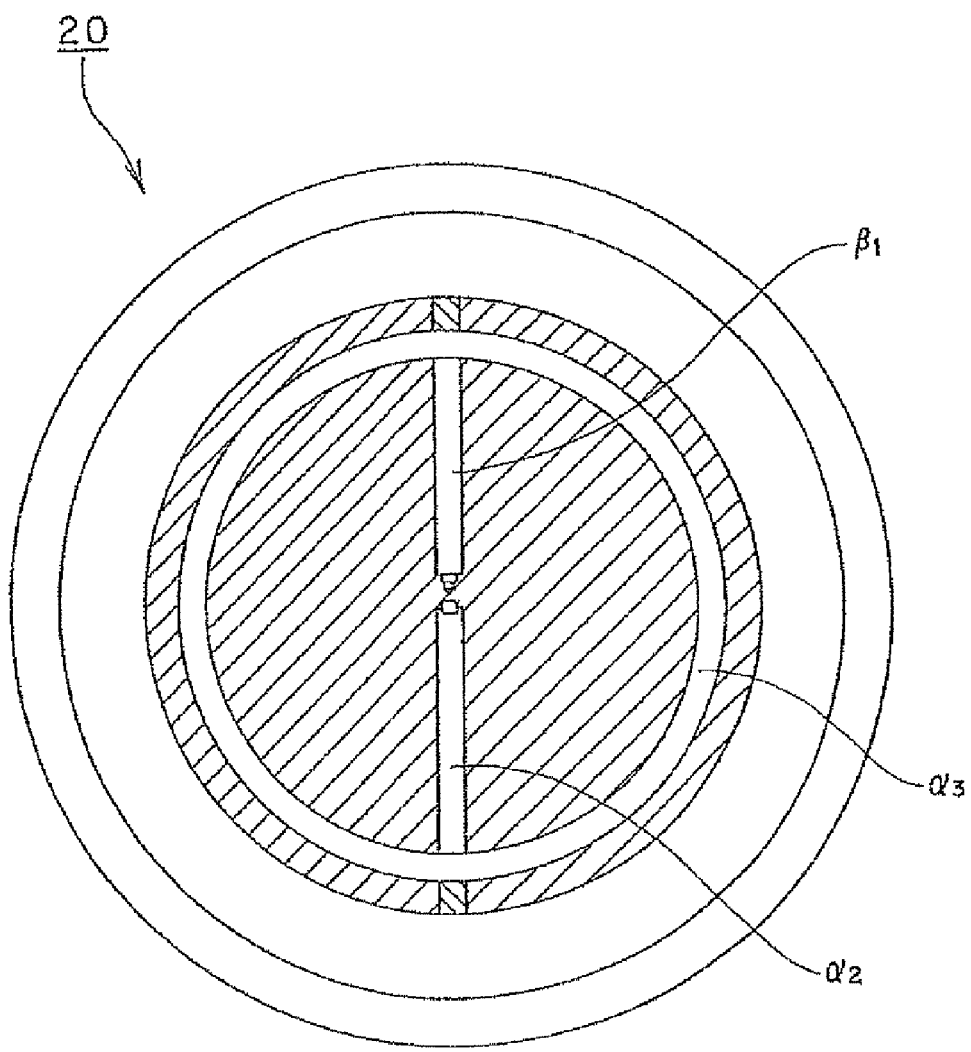
FIG. 5 is a sectional view, especially, of C-C section in FIG. 2, for explaining specific structure of the rotary table device according to the first embodiment.

FIG. 1 is a perspective view showing an outer configuration of an entire structure of a rotary table device according to a first embodiment of the present invention. Further, FIG. 2 is a front view showing an entire structure of the rotary table device according to the first embodiment. FIG. 3 to FIG. 5 are sectional views explaining the specific structure of the rotary table device of the first embodiment, in which FIG. 3 is a sectional view, especially, of A-A section in FIG. 2, FIG. 4 is a sectional view, especially, of B-B section in FIG. 2, and FIG. 5 is a sectional view, especially, of C-C section in FIG. 2. Further, the rotary bearing of the present invention is specifically explained, in the following first embodiment, as rotary roller bearing 30 assembled in a rotary table device 5.

The rotary table device 5 of the first embodiment is provided with a hollow motor 10, a table 20, a rotary roller bearing 30, a brake shaft 40 and a rotary joint 50.

The hollow motor 10 is an inner rotor-type motor of the structure in which a rotor as a rotary body is disposed on the inner side of the hollow structure of the motor 10 and a stator as a stationary body is disposed on the outer side thereof, and the hollow motor 10 functions as a direct drive motor which directly applies a rotational driving power of the motor to the table 20. The rotor is provided with a permanent magnet 12 on a surface opposing to the stator, and this permanent magnet 12 achieves a function as field magnetic flux generation source. On the other hand, a coil unit 16 is disposed on the stator side as magnetic field generation source, and according to mutual function of the permanent magnet 12 and the coil unit 16, the rotational driving of the hollow motor 10 can be realized. Further, the stator is firmly fixed to a fixture plate 17 by bonding a lower side portion of the stator to the fixture plate 17, so that when the hollow motor 10 is driven, only the rotor side can be stably rotationally driven.

The rotor includes an upper member 13 disposed above the permanent magnet 12 and a lower member 14 disposed below thereof. The rotary roller bearing 30 is disposed on the upper portion of the upper member 13 provided for the rotor, and this rotary roller bearing 30 is composed of an outer race 31 formed, at its inner periphery, with two rows of rolling surfaces, an inner race 32 disposed inside the outer race 31, formed, at its outer periphery, with two rows of rolling surfaces opposing to the rolling surfaces of the outer race 31, and a plurality of rollers 33 mounted in a rolling passage formed between rolling surfaces of the inner and outer races 32 and 31.

The upper member 13 provided for the rotor is fixed by means of bolt to the inner race 32 through a bolt hole 32a as attaching means formed to the inner race 32 of the rotary roller bearing 30, which functions as mounting or attaching means for mounting the inner race 32. When the hollow motor 10 is rotationally driven, the inner race 32 side of the rotary roller bearing 30 is also rotated in accordance with the rotational driving of the rotor. That is, in the rotary roller bearing of the first embodiment, the inner race 32 side functions as rotational driving side. Further, the outer race 31 of the rotary roller bearing 30 is firmly fixed to the fixture member of a machine tool, not shown, by means of bolt as mounting means through bolt hole 31a, so that the driving force of the hollow motor 10 can be surely transmitted to the inner race 32 side of the rotary roller bearing 30.

Further, the upper member 13 disposed to the rotor has a fin shaped portion 13a at which it contacts the inner race 32 of the rotary roller bearing 30 in such a manner that heat generated on the inner race 32 side by the high speed rotation of the rotary roller bearing 30 is radiated by function caused by the fin-shaped portion 13a, thus achieving cooling effect. In addition, since the fin-shaped portion 13a is rotated together with the inner race 32, the heat radiation effect may be also enhanced by the rotation thereof.

Furthermore, the table 20 is placed on the inner race 32 of the rotary table bearing 30 through a plate member 35 provided with a cooling fin 35a. This table 20 is a member functioning as a holding member for holding the workpiece to be worked by the machine tool, and is rotated by the rotational driving force from the hollow motor 10, thus performing the working to the workplace.

The table 20 performs smooth and stable rotational motion through the supporting of the rotary roller bearing disposed between the hollow motor 10 and the table 20. Further, another plate member 35 is interposed between the table 20 and the inner race 32 of the rotary roller bearing 30, this plate member 35 being also provided with a cooling fin 35a achieving substantially the same cooling function as that attained by the cooling fin 35a. This cooling fin 35a functions to radiate heat generated on the inner race 32 side because of the high speed rotation of the rotary roller bearing 30 to thereby effectively perform the cooling function by the cooling fin 35a. Particularly, since the cooling fin 35a of this plate member 35 is rotated together with the inner race 32, the heat radiation effect can be enhanced by this rotation of the cooling fin 35a.

The brake shaft 40 is provided on the lower side of the table 20. This brake shaft 40 is a member acting as a passage forming pipe (tube) in which cooling medium passages ($\alpha$, $\beta$) mentioned hereinafter, are formed, and the brake shaft 40 has one end side (upper side on the drawing paper of FIG. 3) which is secured to the table 20 so as to be rotatable together with the table 20. Furthermore, the brake shaft 40 penetrates the inner hollow portion of the rotor of the hollow motor 10 so as to extend downward, and the other one end side (lower side on the drawing paper of FIG. 3) is mounted with the rotary joint 50. According to the structures mentioned above, the cooling medium can be transferred between the brake shaft 40 rotatable together with the rotation of the table 20 and the rotary joint 50 disposed in the fixed manner.

The brake shaft 40 is provided with a brake device 41 at an intermediate portion between the hollow motor 10 and the rotary joint 50. This brake device 41 is operated by receiving a stop signal from a control device of a machine tool, not shown, to thereby stop the rotational motion of the brake shaft 40.

In the above description, although the structure of the rotary table device 5 according to the first embodiment was explained, the cooling structures provided for the rotary table device 5 and the rotary roller bearing 30 are not limited to the structures provided with the fin shaped portion 13a and the cooling fins 35a of the plate member 35, and the rotary table device 5 and the rotary roller bearing 30 according to the first embodiment may be provided with cooling structures having further characteristic features.

That is, the cooling structure of the first embodiment is not limited to the structure provided with the fin shaped member for obtaining the high heat radiation effect by widening the surface area of the member (for example, fin-shaped portion 13a or cooling fin 35a of the plate member 35), and may be provided with means for directly releasing heat generated to the inner race 32 of the rotary roller bearing 30. Such structure will be explained hereunder with reference to FIGS. 3 to 5.

With the rotary table device 5 according to the first embodiment, the cooling medium passages ($\alpha$, $\beta$), through which the cooling medium passes, are formed in adjacent to the inner race 32 as the rotational driving side. The cooling medium passages ($\alpha$, $\beta$) includes a cooling medium introduction passage $\alpha$ which penetrates inside the brake shaft 40 from the rotary joint 50, extends inside the table 20, and flows by one turn along the outer peripheral surface of the rotary roller bearing 30 and also includes a cooling medium discharge passage $\beta$ which extends inside the table 20 from the cooling medium introduction passage $\alpha$, penetrates the inside the brake shaft 40 and flows outward through the rotary joint 50.

The cooling medium introduction passage $\alpha$ first penetrates the central portion of the rotary joint 50 and extends along a root denoted by reference $\alpha_1$ formed to the central portion of the brake shaft 40 along the axial line of the brake shaft 40 contacting the rotary joint 50. The cooling medium introduction passage $\alpha$ rising upward along the axial line of the brake shaft 40 is next connected to the central portion of the table 20, and then extends a passage denoted by reference $\alpha_2$ formed linearly toward the outer peripheral direction from the central portion of the table 20. The cooling medium introduction passage $\alpha$ extending near the outer peripheral end of the table 20 is then connected to a passage demoted by reference $\alpha_3$ circulating by one turn around the outer peripheral surface of the rotary roller bearing 30 through the plate member 35. The cooling medium introduction passage $\alpha$ is terminated at a portion circulating by one turn around the outer peripheral surface of the rotary roller bearing 30 of the plate member 35.

On the other hand, the cooling medium discharge passage $\beta$ is connected to $\alpha$ passage denoted by reference $\alpha_3$ in the cooling medium introduction passage $\alpha$, circulating by one turn along the outer periphery of the rotary roller bearing 30 through the plate member 35, and the discharge passage $\beta$ starts from a passage denoted by reference $\beta_1$ linearly extending to the central portion from a portion near the outer peripheral end of the table 20. Further, the passage, denoted by reference $\beta_1$ of the cooling medium discharge passage $\beta$, inside the table 20 and the passage denoted by reference $\alpha_2$ of the cooling medium introduction passage $\alpha$, are passages which are formed at quite different portions, and for example, as best shown in FIG. 5, it will be preferred that these portions are formed at portions most separated from each other.

Next, the cooling medium discharge passage $\beta$ penetrates the inside of the brake shaft 40. At this time, a passage denoted by reference $\beta_2$ passing through the brake shaft 40 is preferred to be formed at a position on the outer peripheral side with respect to the cooling medium introduction passage $\alpha$ rising upward along the axial line of the brake shaft 40.

Subsequently, the cooling medium discharge passage $\beta$ extending below the lower end of the brake shaft 40 is connected to the rotary joint 50 so as to be communicated outward.

The cooling medium can be introduced into or pass through the thus formed cooling medium introduction passage $\alpha$ and cooling medium discharge passage $\beta$. As the cooling medium, there may be adopted liquid cooling medium such as oil, water or liquid nitrogen, or gaseous cooling medium such as carbon dioxide or carbon hydride (propane, isobutene), ammonium, air, argon, or like.

The cooling medium mentioned above is smoothly transferred between the brake shaft 40 and the rotary joint 50 by the function of the rotary joint 50, i.e., between the rotating body and the stationary body.

Further, the cooling medium introduction passage $\alpha$ of the first embodiment represented by FIGS. 3 to 5 has the portion denoted by reference $\alpha_3$ which is formed along the rotary roller bearing 30 so as to sandwich the plate member 35. Although the plate member 35 achieves the heat radiation effect by the cooling fin 35a formed to the outer periphery thereof, on the other hand, by clogging the bolt hole 32a formed for the attachment of the inner race 32 of the rotary roller bearing 30, it functions for preventing the cooling medium from leaking from the cooling medium introduction passage $\alpha$. This structure is excellent in achievement of double cooling effect including the heat releasing by the cooling medium and heat radiation by the cooling fin 35a of the plate member 35.

Still furthermore, the cooling medium before receiving heat passes through the cooling medium introduction passage $\alpha$ and the cooling medium after receiving the heat passes through the cooling medium discharge passage $\beta$. Accordingly, it is preferred that the cooling medium introduction passage $\alpha$ and the cooling medium discharge passage $\beta$ are formed at positioned separated as far as possible.

However, in a practical structure, the cooling medium introduction passage $\alpha$ and the cooling medium discharge passage $\beta$ must be arranged very nearly within the brake shaft 40, which may provide a structural case. Then, in this first embodiment, it is constructed that the cooling medium before receiving the heat passes through the central portion of the brake shaft 40, and on the other hand, it is also constructed that the cooling medium after receiving the heat passes on the outer peripheral side of the brake shaft 40. According to such arrangement, since the cooling medium after receiving the heat is positioned near the external atmosphere, it becomes possible to possibly reduce heat accumulation within the brake shaft 40.

Further, as another countermeasure against the heat inside the brake shaft, in addition to the positional arrangement between the cooling medium introduction passage $\alpha$ and the cooling medium discharge passage $\beta$, for example, a heat insulation material is wound around the outer peripheral surface of an inner pipe constituting the cooling medium introduction passage $\alpha$ and the cooling medium discharge passage $\beta$ so as to improve the heat insulation performance of the cooling medium introduction passage $\alpha$ and the cooling medium discharge passage $\beta$, themselves.

In the above description, one preferred embodiment of the rotary roller bearing 30 and the rotary table device 5 provided with the cooling structure according to the present invention was explained. However, the technical range of the present invention is not limited to the range described in the above first embodiment, and many other changes and modifications may be made to the above first embodiment.

Figure 6:
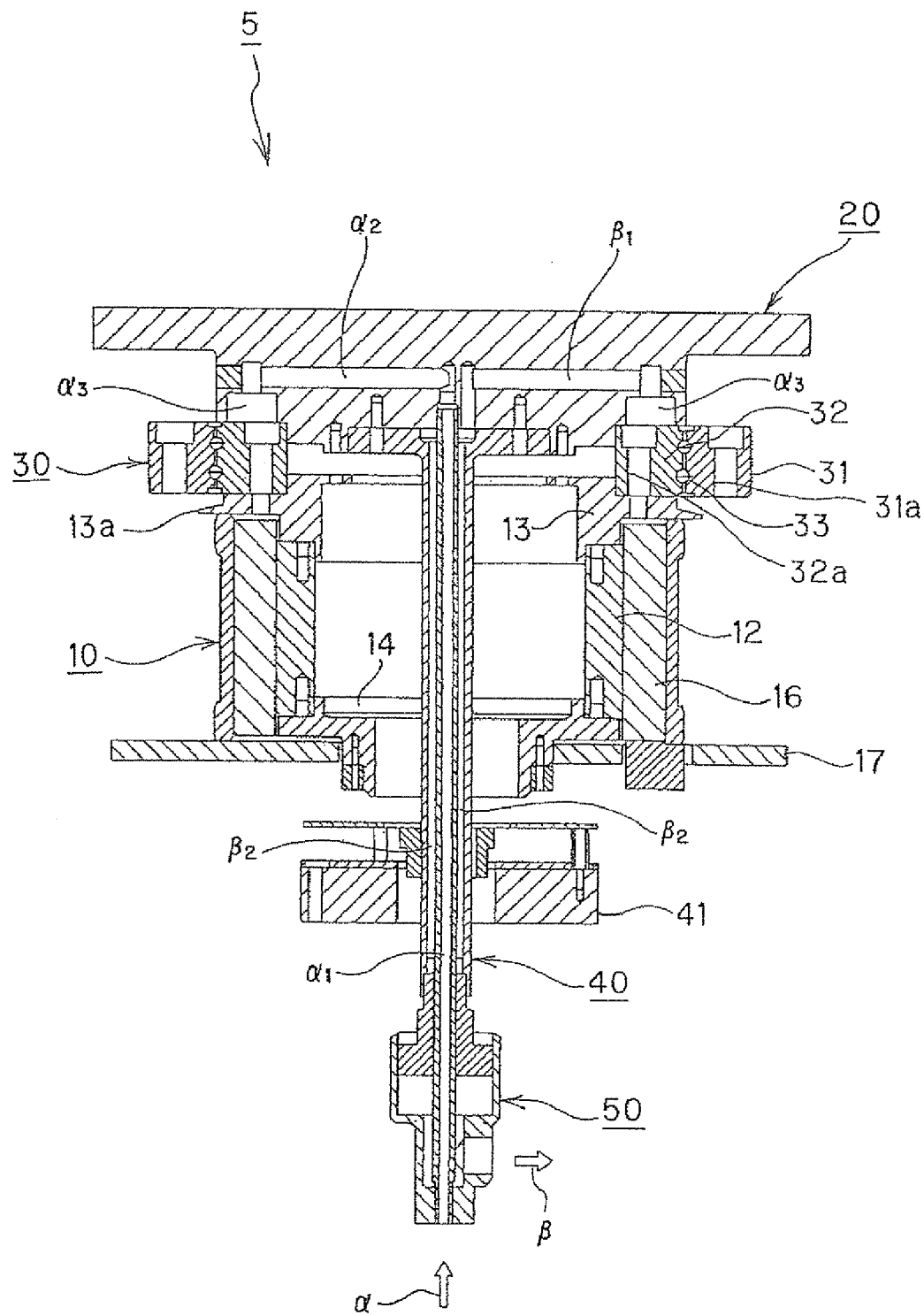
FIG. 6 is an elevational section showing one example of various embodying modes of the rotary table device of the present invention.

For example, the cooling medium introduction passage a of the first embodiment is provided with the portion denoted by reference $\alpha_3$ which is formed along the rotary roller bearing 30 by one turn so as to sandwich the plate member 35. Although this plate member 35 is not essential structural member for the present invention, and for example, as shown in FIG. 6, it may be preferred to have a structure such that a portion, circulating by one turn along the outer peripheral surface of the rotary roller bearing 30, denoted by reference $\alpha_3$ in the cooling medium introduction passage $\alpha$ is directly contacted to the rotary roller bearing 30. By the direct contact of the cooling medium introduction passage $\alpha$ to the rotary roller bearing 30, the cooling effect may be further enhanced.

Furthermore, in order to realize the structure shown in FIG. 6, for example, it may be possible to form the cooling medium passage so that the cooling medium introduction passage $\alpha$ avoids the bolt hole 32a of the inner race 32, to eliminate the bolt hole 32a of the inner race 32 by realizing the attachment of the rotary roller bearing by means other than a bolt, or to place the plate member at a portion at which at least the cooling medium introduction passage $\alpha$ and the bolt hole 32a are closely disposed and the leakage of the cooling medium can be prevented.

Furthermore, in the embodiment mentioned above, there is described an example in which the portion $\alpha_3$ of the cooling medium introduction passage $\alpha$, circulated by one turn along the outer peripheral surface of the rotary roller bearing 30, is formed along only the upper surface side of the inner race 32 of the rotary roller bearing 30. However, the cooling medium introduction passage of the present invention is not limited to such example, and the cooling medium introduction passage may be formed so as to extend along at least a portion of the peripheral surface of the inner race or outer race constituting the rotational driving side.

Further, if a construction may be made such that the inner surface side or lower surface side of the inner race 32, or outer race 31 side constitutes the rotational driving side, the cooling medium passage may be formed so as to extend along the outer race 31 side.

Furthermore, in the above embodiment, there was described an example, in which the cooling medium passage including the cooling medium introduction passage $\alpha$ and the cooling medium discharge passage $\beta$ are formed within the rotary joint 50 and the brake shaft 40 and the table 20. However, a portion for forming the cooling medium passage is not limited to the above members. As far as a structure in which the cooling effect can be achieved by being in adjacent to either one of the inner race or outer race firming the rotational driving side of the rotary bearing is employed, the cooling medium passage may be formed to any member, and for example, the cooling medium passage may be formed within the inner race or outer race, or may be formed to the attaching member to which the rotary bearing is mounted.

In addition, in the described embodiment, there is described the example in which a passage forming pipe inside of which the cooling medium passage is utilized as the brake shaft 40. However, the passage forming pipe inside of which the cooling medium passage is formed is not limited to one utilized as the blare shaft 40, and the passage forming pipe as a pipe member used only for the passage forming pipe may be formed, or may be formed so as to achieve another functions.

Still furthermore, the rotary bearing of the present invention is not limited to the described rotary roller bearing 30, and other various type rotary bearings using balls as rolling members may be employed as far as properly bearing the rotational motion of the table 20.

Still furthermore, in the described first embodiment, there is described the example in which the hollow motor of the present invention employs the inner-rotor type hollow motor 10 in which the rotor as the rotating body is disposed on the inward side and the stator as the stationary body is disposed on the outward side. However, as the hollow motor of the present invention, there may be employed an outer-rotor type hollow motor in which the rotor as the rotating body is disposed on the outward side and the stator as the stationary body is disposed on the inward side.

Embodiments or like applied with the above described changes or modifications may be within technical range of the present invention.

Second Embodiment

Hereunder, another preferred embodiment for embodying the present invention will be explained with reference to FIGS. 7 to 11. Further, it is to be noted that the following second embodiment is not limited to the invention of the respective patent claims and all the combination of the subject features described in the second embodiment is not absolutely essential for the achievement of the present invention.

Figure 7:
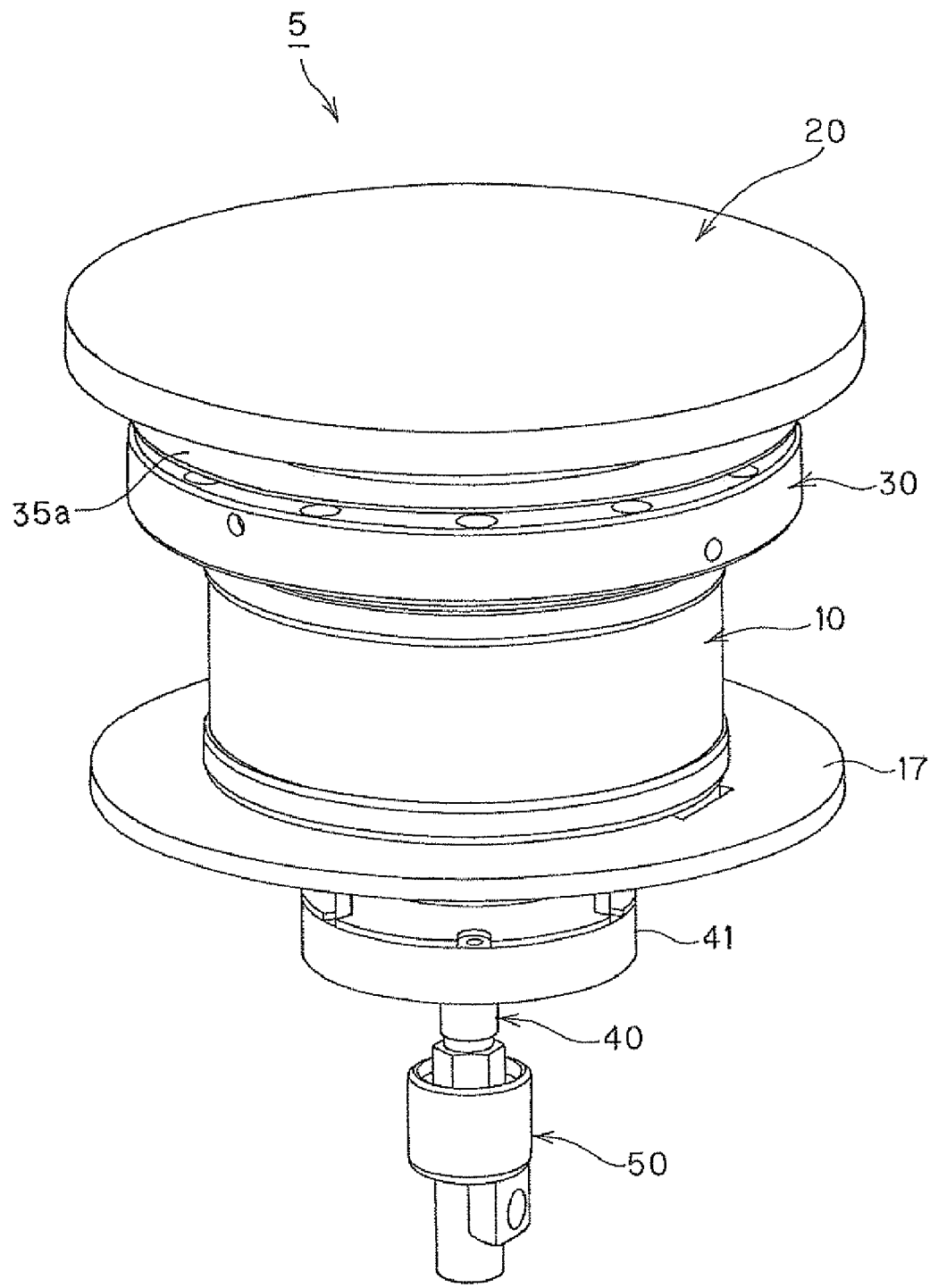
FIG. 7 is a perspective view showing an outer configuration of an entire structure of a rotary table device according to a second embodiment of the present invention.
Figure 8:
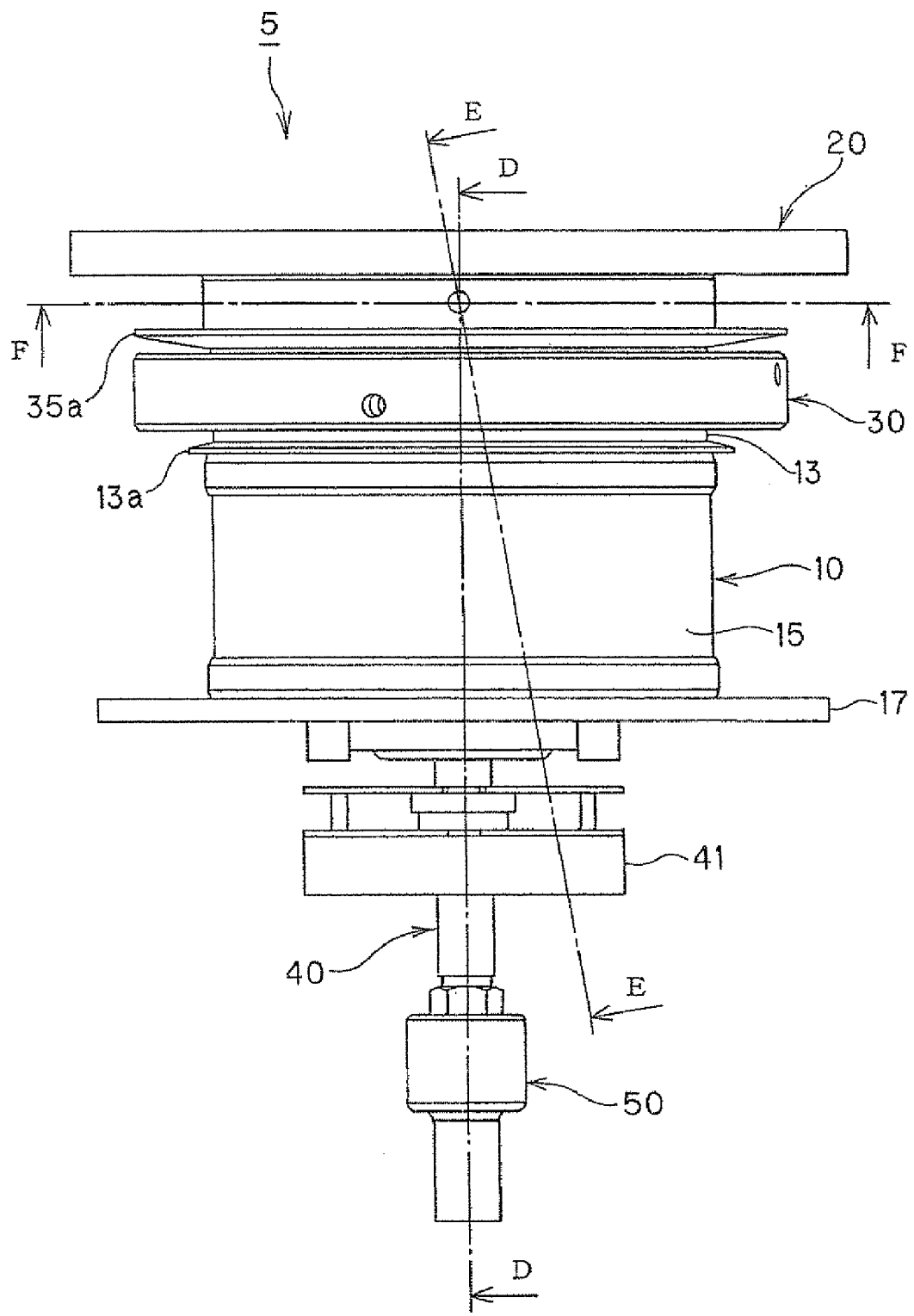
FIG. 8 is a front view showing an entire structure of the rotary table device according to the second embodiment.
Figure 9:
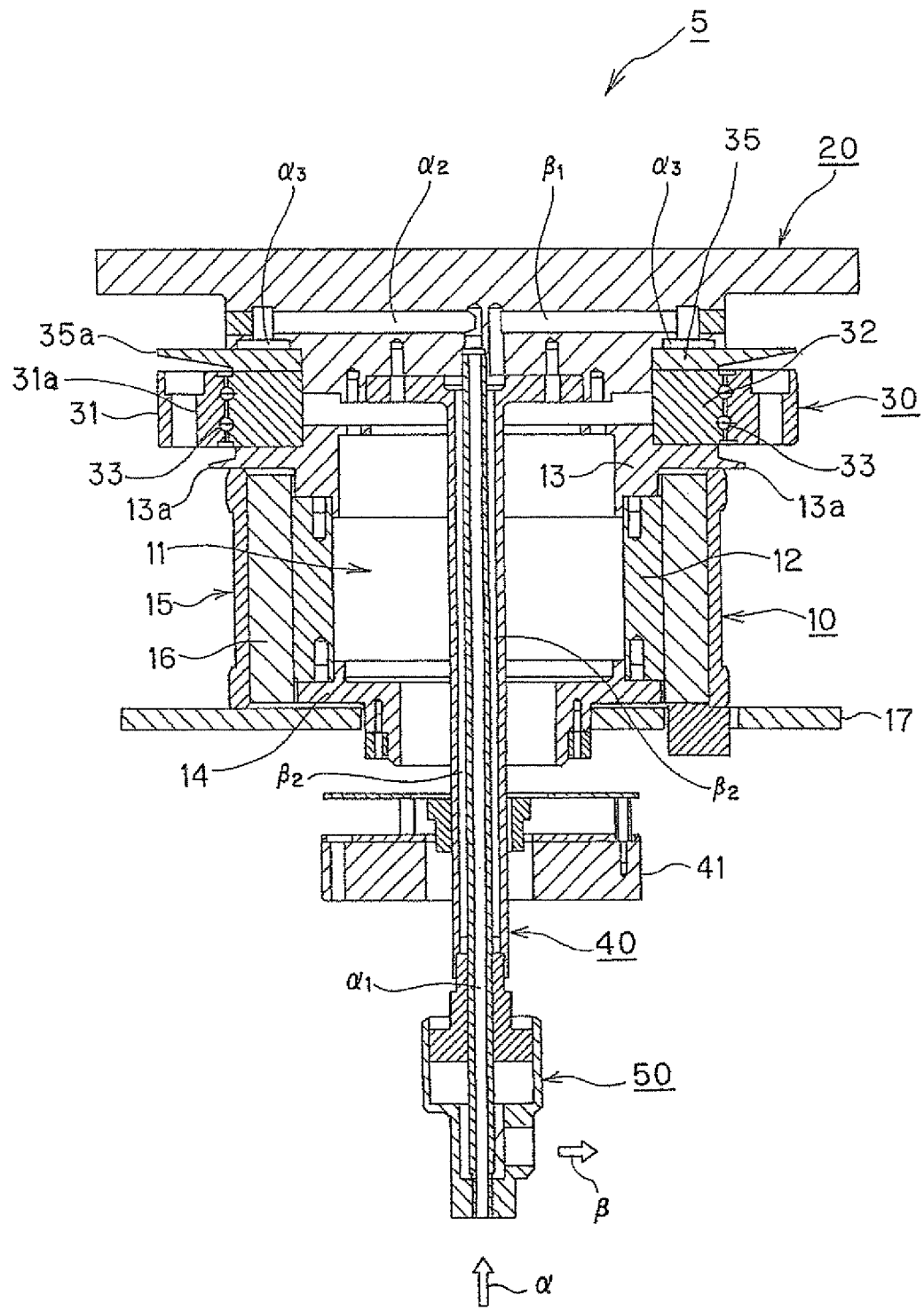
FIG. 9 is a sectional view, especially, of D-D section in FIG. 8, for explaining specific structure of the rotary table device according to the second embodiment.
Figure 10:
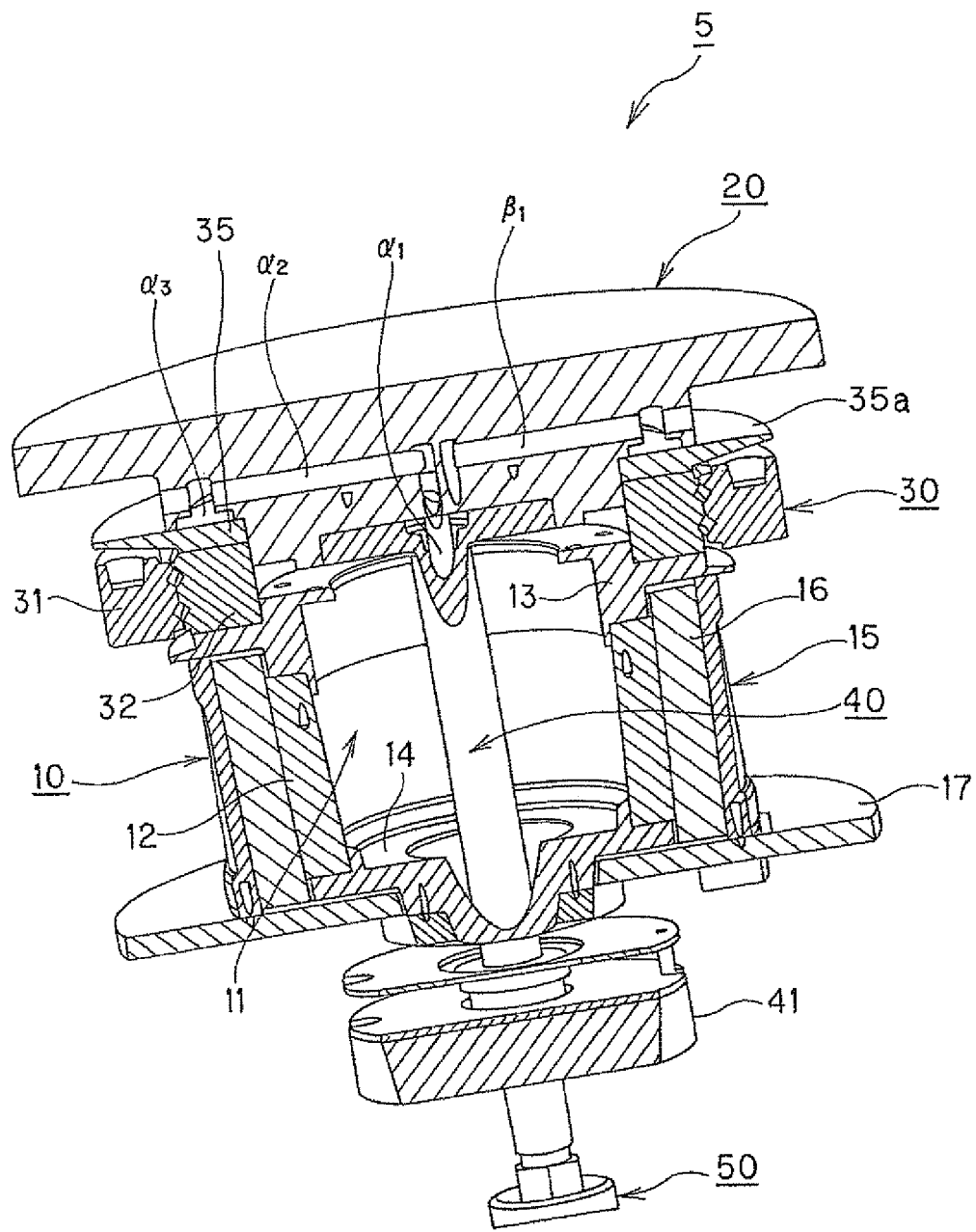
FIG. 10 is a sectional view, especially, of E-E section in FIG. 8, for explaining specific structure of the rotary table device according to the second embodiment.
Figure 11:
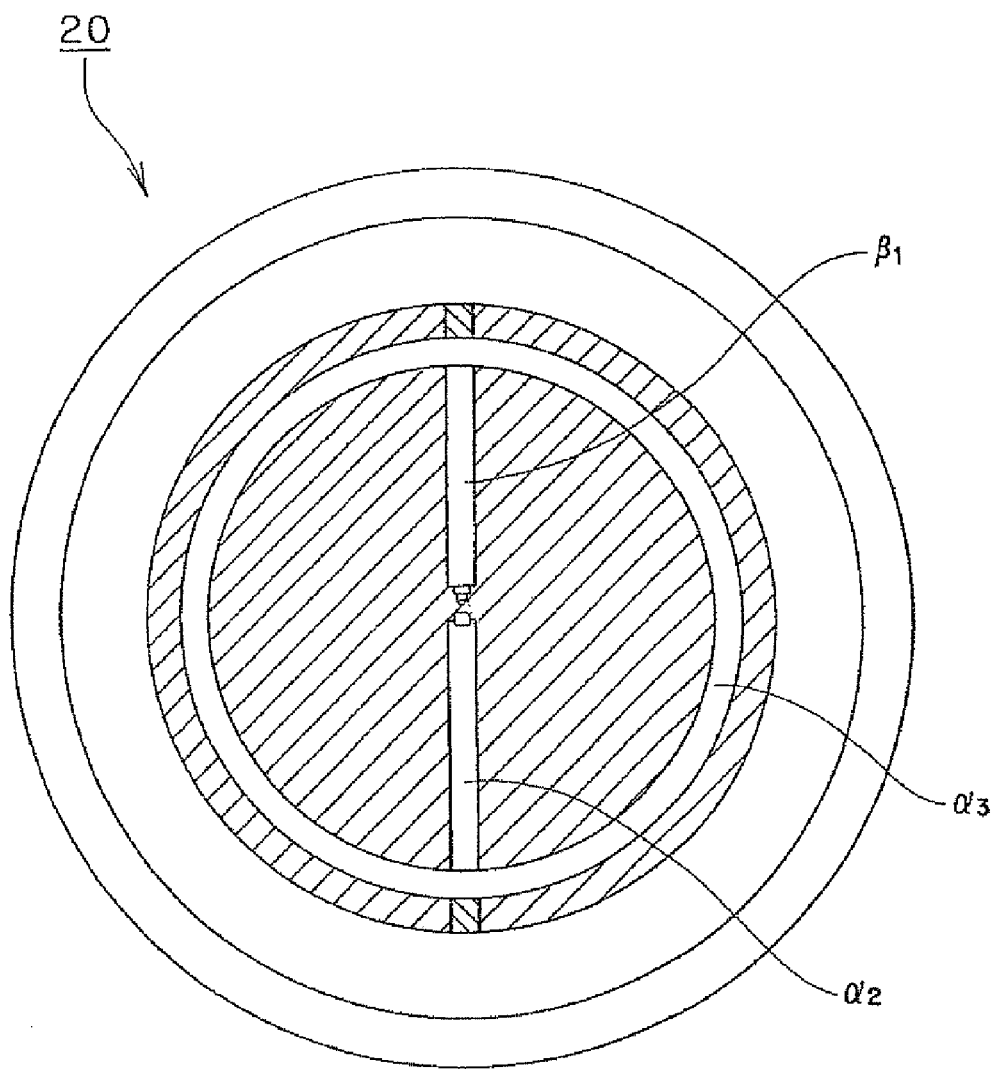
FIG. 11 is a sectional view, especially, of F-F section in FIG. 8, for explaining specific structure of the rotary table device according to the second embodiment.

FIG. 7 is a perspective view showing an outer appearance of an entire structure of a rotary table device according to the second embodiment of the present invention. FIG. 8 is a front view showing the entire structure of the rotary table device according to the second embodiment of the present invention. FIGS. 9 to 11 are sectional views for explaining the specific structure of the rotary table device according to the second embodiment of the present invention, and in particular, FIG. 9 is a sectional view taken along the line D-D in FIG. 8, FIG. 10 is a sectional view taken along the line E-E in FIG. 8, and FIG. 10 is a sectional view taken along the line F-F in FIG. 8.

The rotary table device 5 according to the second embodiment includes a hollow motor 10, a table 5, a rotary roller bearing 30, a brake shaft 40 and a rotary joint 50.

The hollow motor 10 is an inner-rotor type motor, in which the rotor as the rotating body is disposed on the inward side and the stator as the stationary body is disposed on the outward side, and serves a direct drive motor which directly applies the rotational driving power to the table 20.

The rotor is provided with a permanent magnet 12 on a surface opposing to the stator, and this permanent magnet 12 achieves a function as field magnetic flux generation source. On the other hand, a coil unit 16 is disposed on the stator side as magnetic field generation source, and according to mutual function of the permanent magnet 12 and the coil unit 16, the rotational driving of the hollow motor 10 can be realized. Further, the stator is firmly fixed to a fixture plate 17 by bonding a lower side portion of the stator to the fixture plate 17, so that when the hollow motor 10 is driven, only the rotor side can be stably rotationally driven.

The rotor includes an upper member 13 disposed above the permanent magnet 12 and a lower member 14 disposed below the permanent magnet 12.

The rotary roller bearing 30 is disposed on the upper portion of the upper member 13 provided for the rotor, and this rotary roller bearing 30 is provided with an outer race 31 formed, at its inner periphery, with two rows of rolling surfaces, an inner race 32 disposed inside the outer race 31, formed, at its outer periphery, with two rows of rolling surfaces opposing to the rolling surfaces of the outer race 31, and a plurality of rollers 33 disposed in rolling passages formed between rolling surfaces of the inner and outer races 32 and 31.

Furthermore, the plural rollers 33 constituting the rotary roller bearing 30 is configured so as to provide an angular contact with respect to two rows of rolling passages formed by the two-rows of rolling surfaces of the outer race 31 and the two-rows of rolling surfaces of the inner race 32. That is, in the rotary roller bearing 30 of the second embodiment, a plurality of rollers 33 respectively mounted in the two-rows of rolling passages has an arrangement in which functional line of a load prescribed as virtual line extending in a direction perpendicular to the rolling surface of the roller 33 inclines in a constant direction for every row with respect to the radial direction of the rotary bearing 30 in a sectional area along the axial direction of the rotary bearing 30, and in addition, functional line of a load of the roller 33 of one rolling passage and functional line of a load of the roller in the other rolling passage intersect on the inner peripheral side or outer peripheral side with respect to the two-rows of the rolling passages. Since the rotary roller bearing 30 according to the second embodiment has the structure mentioned above, the smooth and no saccadic rotation can be realized.

The upper member 13 disposed to the rotor has a fin shaped portion 13a at which it contacts the inner race 32 of the rotary roller bearing 30 in such a manner that heat generated on the inner race 32 side by the high speed rotation of the rotary roller bearing 30 is radiated by function caused by the fin-shaped portion 13a, thus achieving cooling effect. In addition, since the fin-shaped portion 13a is rotated together with the inner race 32, the heat radiation effect may also be enhanced by the rotation thereof.

Furthermore, the table 20 is placed on the inner race 32 of the rotary table bearing 30 through a plate member 35 provided with a cooling fin 35a. This table 20 is a member functioning as a holding member for holding the workpiece to be worked by the machine tool, and is rotated by the rotational driving force from the hollow motor 10, thus performing the working to the workpiece.

The cooling fin 35a of the plate member 35 disposed between the table 20 and the inner race of the rotary roller bearing 30 is a member capable of achieving the same function and effect as those of the fin-shaped portions 13a. This cooling fin 35a functions to radiate heat generated on the inner race 32 side because of the high speed rotation of the rotary roller bearing 30 to thereby effectively perform the cooling function by the cooling fin 35a. Particularly, since the cooling fin 35a of this plate member 35 is rotated together with the inner race 32, the heat radiation effect can be enhanced by this rotation of the cooling fin 35a.

Further, the inner race 32 of the rotary roller bearing 30 is surely sandwiched between the upper member fixedly connected to the rotor and the plate member 35 firmly connected to the table 20. That is, the upper member 13 and the plate member 35 are cooperated to thereby act as mounting member for mounting the inner race 32. Accordingly, when the hollow motor 10 is rotationally driven, the table 20 and the inner race 32 side of the rotary roller bearing 30 are rotated by the rotational driving of the rotor. That is, as to the outer race 31 of the rotary roller bearing 30, since it is firmly fixed to the stationary member of a machine tool, not shown, by using the bolt hole 31a, the driving force of the hollow motor 10 is surely transferred to the inner race 32 side of the rotary roller bearing 30.

The brake shaft 40 is disposed perpendicularly to the central portion of the surface of the lower side of the table 20. This brake shaft 40 is a member acting as a passage forming pipe in which cooling medium passages ($\alpha$, $\beta$), mentioned hereinafter, are formed, and the brake shaft 40 has one end side (upper side on the drawing paper of FIG. 9) which is secured to the table 20 to be rotatable together with the table 20. Furthermore, the brake shaft 40 penetrates the inner hollow portion of the rotor of the hollow motor 10 so as to extend downward, and the other one end side (lower side on the drawing paper of FIG. 9) is mounted with the rotary joint 50. According to the structures mentioned above, the cooling medium can be transferred between the brake shaft 40 rotatable together with the rotation of the table 20 and the rotary joint 50 disposed in the fixed manner.

The brake shaft 40 is provided with a brake device 41 at an intermediate portion between the hollow motor 10 and the rotary joint 50. This brake device 41 is operated by receiving a stop signal from a control device of a machine tool, not shown, to thereby stop the rotational motion of the brake shaft 40.

In the above, although the structure of the rotary table device 5 according to the second embodiment was described, the cooling structures provided for the rotary table device 5 and the rotary roller bearing 30 are not limited to the structures provided with the fins 13a and the cooling fins 35a of the plate member 35, and the rotary table device 5 and the rotary roller bearing 30 according to the second embodiment may be provided with cooling structures having further characteristic features.

That is, the cooling structure of the second embodiment is not limited to the structure provided with the fin shaped member for obtaining the high heat radiation effect by widening the surface area of the member (for example, fin-shaped portion 13a or cooling fin 35a of the plate member 33), and may be provided with means for directly releasing heat generated to the inner race 32 of the rotary roller bearing 30. Such structure will be explained hereunder with reference to FIGS. 9 to 11, in the rotary table device 5 according to the second embodiment, the cooling medium passages ($\alpha$, $\beta$), through which the cooling medium passes, are formed in adjacent to the inner race 32 as the rotational driving side. The cooling medium passages ($\alpha$, $\beta$) includes a cooling medium introduction passage $\alpha$ which penetrates inside the brake shaft 40 from the rotary joint 50, extends inside the table 20, and flows by one turn along the outer peripheral surface of the rotary roller bearing 30 and a cooling medium discharge passage $\beta$ which extends inside the table 20 from the cooling medium introduction passage $\alpha$, penetrates the inside the brake shaft 40 and flows outward through the rotary joint 50.

The cooling medium introduction passage $\alpha$ first penetrates the central portion of the rotary joint 50 and extends along a root denoted by reference $\alpha_1$ formed to the central portion of the brake shaft 40 along the axial line of the brake shaft 40 contacting the rotary joint 50. The cooling medium introduction passage $\alpha$ rising up along the axial line of the brake shaft 40 is next connected to the central portion of the table 20, and then advances a passage denoted by reference $\alpha_2$ formed linearly toward the outer peripheral direction from the central portion of the table 20. The cooling medium introduction passage $\alpha$ extending near the outer peripheral end of the table 20 is then connected to a passage demoted by reference $\alpha_3$ circulating by one turn around the outer peripheral surface of the rotary roller bearing 30 through the plate member 35. The cooling medium introduction passage $\alpha$ is terminated at a portion circulating by one turn around the outer peripheral surface of the rotary roller bearing 30 of the plate member 35.

On the other hand, the cooling medium discharge passage $\beta$ is connected to a passage denoted by reference $\alpha_3$, in the cooling medium introduction passage α, circulating by one turn along the outer periphery of the rotary roller bearing 30 through the plate member 35, and the discharge passage β starts from a passage denoted by reference $β_1$ linearly extending to the central portion from a portion near the outer peripheral end of the table 20. Further, the passage, denoted by reference $β_1$ of the cooling medium discharge passage β, inside the table 20 and the passage denoted by reference $α_2$ of the cooling medium introduction passage α, are passages which are formed at quite different portions, and for example, as best shown in FIG. 11, it will be preferred that these portions are formed at portions separated as far as possible.

Next, the cooling medium discharge passage β penetrates the inside of the brake shaft 40. At this time, a passage denoted by reference $β_2$ passing through the brake shaft 40 is preferred to be formed at a position on the outer peripheral side with respect to the cooling medium introduction passage α rising us along the axial line of the brake shaft 40.

Subsequently, the cooling medium discharge passage β reaching the lower end of the brake shaft 40 is connected to the rotary joint 50 so as to be communicated outward.

The cooling medium can be introduced into or pass through the thus formed cooling medium introduction passage α and cooling medium discharge passage β. As the cooling medium, there may be adopted liquid cooling medium such as oil, water or liquid nitrogen, or gaseous cooling medium such as carbon dioxide or carbon hydride (propane, isobutene), ammonium, air, argon, or like.

The cooling medium mentioned above is smoothly transferred between the brake shaft 40 and the rotary joint 50 by the function of the rotary joint 50, i.e., between the rotating body and the stationary body.

Figure 12:
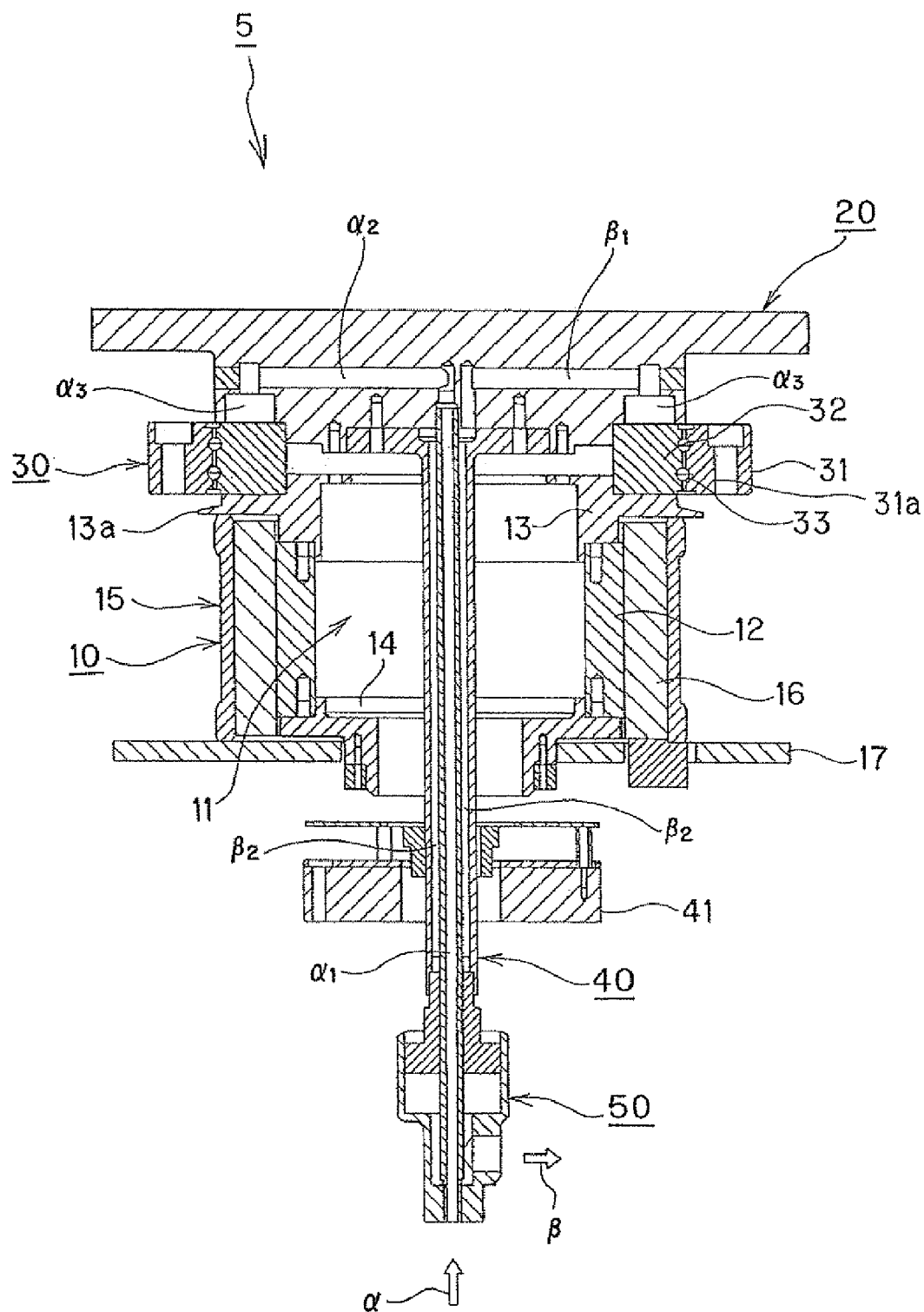
FIG. 12 is an elevational section showing one example of various embodying modes of the rotary table device of the present invention.

Further, the cooling medium introduction passage α of the second embodiment represented by FIGS. 9 to 11 has the portion denoted by reference $α_3$ which is formed along the rotary roller bearing 30 so as to sandwich the plate member 35. Although the plate member 35 achieves the heat radiation effect by the cooling fin 35a formed to the outer periphery thereof, in an environment in use in which so much heat radiation effect is not required, the plate member 35 may be eliminated as shown in FIG. 12, and such a portion as shown by the reference $α_3$ of the cooling medium introduction passage α may be formed by utilizing the upper surface of the inner race 32 constituting the rotary roller bearing 30. Such construction may be enabled by sandwiching the mounting structure of the inner race 32 between the member on the rotor side constituting the hollow motor 10 (i.e. upper member 13 to be connected to the rotor in FIGS. 9 and 12, which hence may be a rotor itself) and the member on the table 20 side (i.e., plate member 35 to be connected to the table 20 in FIG. 9, or table 20 itself in FIG. 12). By the employment of such structure, the cooling medium introduction passage α can be easily formed. In addition, as shown in FIG. 12, by directly contact between the cooling medium introduction passage α and the rotary roller bearing 30, it becomes possible to enhance the cooling effect of the cooling medium.

Still furthermore, the cooling medium before receiving heat passes through the cooling medium introduction passage α, and the cooling medium after receiving the heat passes through the cooling medium discharge passage β. Accordingly, it is preferred that the cooling medium introduction passage α and the cooling medium discharge passage β are formed at positions separated as far as possible, and as mentioned above, in the table 20, there is adopted an arrangement in which the cooling medium introduction passage α and the cooling medium discharge passage β are formed at positions separated as far as possible.

However, in the brake shaft 40, the cooling medium introduction passage α and the cooling medium discharge passage β must be arranged very nearly within the brake shaft 40, which may provide a structural case. Then, in this second embodiment, it is constructed that the cooling medium before receiving the heat passes through the central portion of the brake shaft 40, and on the other hand, it is also constructed that the cooling medium after receiving the heat passes on the outer peripheral side of the brake shaft 40. According to such arrangement, since the cooling medium after receiving the heat is positioned near the external atmosphere, the accumulation of the heat within the brake shaft 40 can be possibly reduced. Further, as another countermeasure against the heat inside the brake shaft, in addition to the positional arrangement between the cooling medium introduction passage α and the cooling medium discharge passage β, for example, a heat insulation material is wound around the outer peripheral surface of an inner pipe constituting the cooling medium introduction passage α and the cooling medium discharge passage β so as to improve the heat insulation performance of the cooling medium introduction passage α and the cooling medium discharge passage β, themselves.

As explained above, in the rotary table device 5 according to the second embodiment, the hollow motor 10 is constructed as a direct drive motor which directly affects the rotational driving power to the table 20. Accordingly, the table 20 can perform smooth and stable rotational motion by the supporting function of the rotary roller bearing 30 disposed between the table 5 and the hollow motor 10. In addition, the rotary roller bearing 30 according to the second embodiment is provided with a plurality of heat radiation elements such as fin-shaped portion 13a, the cooling fin 35a, the cooling medium introduction passage α and the cooling medium discharge passage β, so that functional combination of the rotary bearing and the direct drive motor is realized, and accordingly, the rotary table device 5 realizing the high performance, the high speed rotation and the high load-bearing performance, which could not realized by the prior art, can be achieved.

Hereunder, a table diameter determining method at a time of appropriately designing the rotary table device 5 of the second embodiment of the structure mentioned above will be described. Such table diameter determining method is a method of determining the diameter of the table 20, which has not been mentioned in a conventional technology.

In the table diameter determining method concerning the second embodiment, there are defined such as D (mm): table diameter; L (mm): total length of table and work; M (kg): total weight of table and work; η (kg/mm³): specific gravity of table; and J (kg·m²): inertial of table. Then, first, computer program is executed to input at least one set of D and M (DM inputting step). In such DM inputting step, the input set of D and M may be optionally selected in accordance with commercial needs or conventional machine capacity or ability, and a plurality sets of D and M may be selected as candidate values, which will be then input into the computer.

Next, by substituting the D and M input in the above DM inputting step into the following mathematical expression (1), an operator operates the computer to execute an L-calculating step to thereby calculate the total length L. Further, this L-calculating step is automatically and instantaneously executed based on a program installed in the computer.

[Expression 4]

$$L = 4M/\pi\eta D^2 \tag{1}$$

Furthermore, by substituting the set of D, M, L obtained by the L-calculating step into the following expression (2), the inertia J is calculated (J-calculating step). Further, this J-calculating step is also automatically and instantaneously executed based on a program installed in the computer.

[Expression 5]

$$J = M \times (D^2/26 + L^2/12) \quad (2)$$

Thereafter, based on the thus calculated inertia J in the J-calculating step, the following DM selection step for selecting the set of D and M satisfying the following inequality expression (3)

[Expression 6]

$$J \leq \text{Largest Load Inertia of Hollow Motor} \quad (3)$$

By executing the above processings through the computer, it becomes possible to determine the diameter of the table. The table diameter determining method in connection with the second embodiment will provide the following advantageous effects. That is, a designer optionally inputs a plurality of D/M sets, and based on this optional value, most suitable table diameter D is obtainable. By utilizing such table diameter determining method of the characters mentioned above in connection with the second embodiment, every person can easily obtain the most suitable table diameter.

In the above description, the preferred embodiments of the rotary table device and the table diameter determining method according to the present invention was explained. However, the technical scope of the present invention is not limited to the scope of the description of the second embodiment. The second embodiment may be applied with various changes and improvements. For example, in the above embodiment, although there is described the example in which the portion $\alpha_3$, of the cooling medium introduction passage α circulating by one turn along the outer peripheral surface of the rotary roller bearing 30, is formed so as to extend only along the upper surface side of the inner race 32 of the rotary roller bearing 30, the cooling medium introduction passage of the present invention is not limited to this example, and it may be formed so as to extend along at least a portion of the peripheral surface of the inner race or outer race constituting the rotational driving side.

Further, if possible in construction, the cooling medium passage may be formed along the outer race 31 side in the case where the inner surface side or lower surface side of the inner race 32, or outer race 31 side constitutes the rotational driving side.

Furthermore, in the second embodiment mentioned above, there is described an example in which the cooling medium passage including the cooling medium introduction passage α and the cooling medium discharge passage β is formed within the rotary joint 50, the brake shaft 40 and the table 20. However, the arrangement of the cooling medium passage is not limited to the members mentioned above, and the cooling medium passage may be formed to any member, as far as the cooling effect can by achieved by closely contacting either one of the inner race or outer race constituting the rotational driving side of the rotary bearing. For example, the cooling medium passage may be formed inside the inner race or outer race, or may be formed with respect to the mounting member to which the rotary bearing is mounted.

Still furthermore, in the described embodiment, there is described the example in which a passage forming pipe formed inside the cooling medium passage is used as the brake shaft 40. However, the passage forming pipe is not limited to the member used for the brake shaft 40, and the passage forming pipe may be composed of a pipe or like member which is merely used as a passage forming pipe, or another member attaining other function may be used.

Still furthermore, The rotary bearing of the present invention is not limited to the rotary roller bearing 30 mentioned hereinabove, and a bearing using balls as rolling members or every type rotary bearing may be used as far as it bears the rotational motion of the table 20.

Still furthermore, in the described second embodiment, the hollow motor of the present invention is referred to as the hollow motor 10 of the inner rotor type in which the rotor as the rotating body is disposed on the inner side and the stator as the stationary body is disposed on the outer side. However, an outer rotor type hollow motor, in which the rotor as the rotating body is disposed on the outer side and the stator as the stationary body is disposed on the inner side, may be employed as the hollow motor of the present invention.

Still furthermore, the table diameter determining method according to the second embodiment is a method explaining the basic steps of the method of the present invention, and therefore, any type of computer, program or program language may be adopted as far as it utilizes for executing the method of the present invention.

It will be further apparent that modes to which such changes or improvements are incorporated are included in the technical scopes of the present invention.

The invention claimed is:

1. A rotary table device comprising:
a hollow motor constituting a drive source;
a table rotated by the hollow motor; and a rotary bearing supporting rotational motion of the table, the rotary bearing comprising:
an outer race having an inner surface to which a rolling surface is formed;
an inner race having an outer peripheral surface to which a rolling surface opposing to the rolling surface of the outer race is formed; and
a plurality of rolling members disposed in a rolling passage formed by the rolling surface of the outer race and the rolling surface of the inner race, wherein a cooling medium passage is formed between the table and at least one of the inner race and outer race constituting a rotational driving side,
wherein the at least one of the inner race and outer race constituting a rotational driving side provide a plate member which is rotatable together with at least one of the inner race and outer race constituting a rotational driving side, and the plate member provided with a cooling fin on the outer peripheral surface.

2. The rotary table device according to claim 1, further comprising a passage forming pipe connected to said table at one end and extending within the hollow motor, at least a portion of the cooling medium passage penetrates the passage forming pipe.

3. The rotary table device according to claim 2, wherein the cooling medium passage includes a cooling medium introduction passage for introducing the cooling medium before heat radiation of the rotary bearing, and a cooling medium discharge passage for discharging the cooling medium after the heat radiation of the rotary bearing, and wherein the cooling medium introduction passage and the cooling medium discharge passage both penetrating the passage forming pipe are formed along an axial line of the passage forming pipe, and the cooling medium discharge passage is disposed on an outer peripheral side of the cooling medium introduction passage.

4. The rotary table device according to claim 3, wherein the passage forming pipe is composed of a brake shaft.

5. The rotary table device according to claim 2, wherein the passage forming pipe is composed of a brake shaft.

6. The rotary table device according to claim 1, wherein the cooling medium passage is formed along at least a portion of a peripheral surface of either one of the inner race and outer race constituting the rotational driving side.

7. The rotary table device according to claim 1, wherein the outer race and the inner race are provided with mounting means used for attachment, and a plate member is interposed to at least a portion at which the cooling medium passage and the mounting means are adjacently disposed.

8. The rotary table device according to claim 7, wherein the plate member is rotated together with the either one of the inner race and outer race constituting a rotational driving side, and the plate member provided with a cooling fin on the outer peripheral surface.

9. The rotary table device according to claim 1, wherein the cooling medium passage is provided for the table.

10. A table diameter determining method of determining a diameter of a table of a rotary table device, the rotary table device comprises a hollow motor constituting a driving source to rotate the table and a rotary bearing supporting rotational motion of the table, wherein the hollow motor is composed of a direct drive motor to directly give a rotational driving force to the table, the table diameter determining method comprising:

a D and M inputting step of inputting at least one set of D and M;

an L calculating step of calculating an L by substituting the D and M input in the D and M inputting step into a following expression (1);

a J calculating step of calculating a J by substituting a set of the D, M and L obtained by the L calculating step into a following expression (2); and a D and M selecting step of selecting the set of the D and M satisfying a following inequality expression (3) based on the J calculated in the J calculating step,

[Expression 1]

$$L = 4M/\pi\eta D^2 \qquad (1)$$

[Expression 2]

$$J = M \times (D^2/26 + L^2/12) \qquad (2)$$

[Expression 3]

$$J \leq \text{Largest Load Inertia of Hollow Motor} \qquad (3)$$

wherein D (mm): table diameter; L (mm): total length of table and work; M (kg): total weight of table and work; $\eta$ (kg/mm$^3$): specific gravity of table; and J (kg·m$^2$): inertia of table.

* * * * *